April 17, 1945.  G. F. DRAKE  2,373,663
REVERSIBLE MAGNETIC GEARING
Filed Nov. 26, 1943
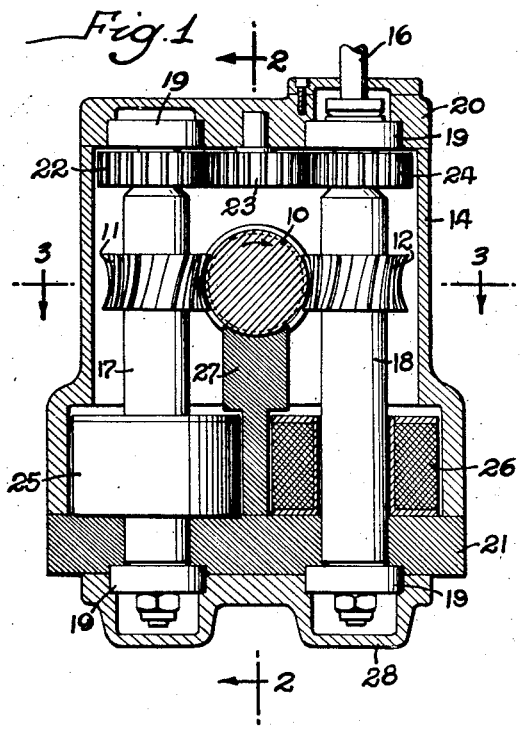
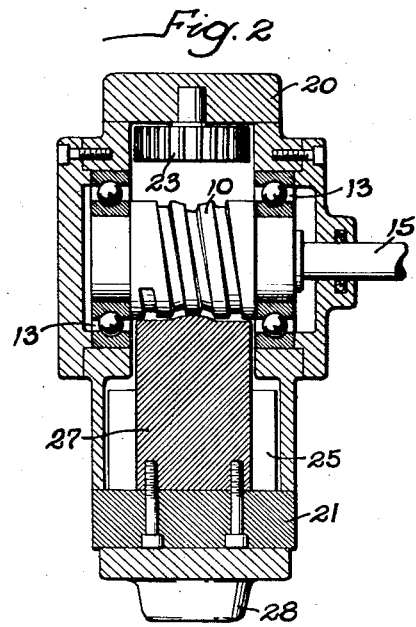
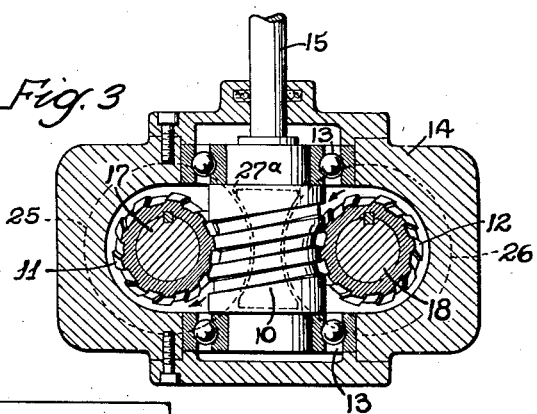
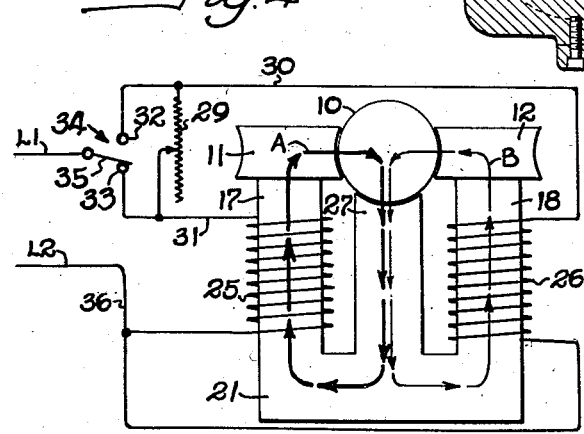
INVENTOR
George Forrest Drake
By Parker, Carlson, Pitzner Hubbard
ATTORNEYS Patented Apr. 17, 1945

2,373,663

UNITED STATES PATENT OFFICE 2,373,663

REVERSIBLE MAGNETIC GEARING

George Forrest Drake, Rockford, Ill., assignor to Woodward Governor Company, Rockford, Ill., a corporation of Illinois Application November 26, 1943, Serial No. 511,819

9 Claims. (Cl. 172—284)

The present invention pertains to a novel magnetic gearing.

One object of the present invention is to provide a novel reversible magnetic gearing.

Another object is to provide a magnetic gearing which will transmit rotary power in either direction depending on which of two flux paths is energized and which incorporates means for minimizing the effect of flux leakage through the inactive flux path.

Further objects and advantages of the invention will become apparent as the following description proceeds, taken in connection with the accompanying drawing in which:

Figure 1 is a vertical sectional view of a reversible magnetic gearing embodying the present invention.

Fig. 2 is a sectional view taken substantially along the line 2—2 in Fig. 1.

Fig. 3 is a transverse sectional view taken substantially along the line 3—3 in Fig. 1.

Fig. 4 is a schematic wiring diagram of the device.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention herein illustrated, the improved gearing comprises a driving element in the form of a worm 10 and two alternatively available driven elements in the form of worm gears 11, 12 supported on diametrically opposite sides of the worm with their axes spaced from and extending at right angles to the worm axis. While various suitable tooth forms may be employed, a helical thread is provided on the worm 10 while the gears 11, 12 have spiral teeth which are throat cut with their peripheries concaved in conformity with the outer diameter of the worm.

The teeth of the gears 11, 12 are of the same pitch as the thread on the drive worm and are disposed closely adjacent but out of contact with the worm whose periphery is concaved longitudinally to follow closely the transverse exterior of the gear teeth. The gears are similarly curved longitudinally to match the transverse contour of the worm. The width of the faces of each gear tooth substantially matches the width of the face of the worm thread. The minimum clearance between the coacting opposed faces of the gear teeth and worm thread is desirably of the order of about .004 inch and the maximum of the order of about .010 inch.

The worm and worm gears are composed of magnetizable material so that if a magnetic flux is caused to link the worm 10 and worm gear 11, the latter will be revolved substantially as if it were in mesh with the worm. Conversely, if flux links the worm 10 with the other worm gear 12 the latter will likewise be revolved but in an opposite direction, assuming unidirectional rotation of the drive worm. In each instance the flux linking the worm 10 with one of the worm gears 11, 12 tends to maintain a minimum air gap between them so that the selected worm gear is revoked by the resulting tendency of its teeth to follow, or remain in registry with, the thread of the worm.

The worm 10 is shown as journaled in antifriction bearings 13 in the opposite side walls of a suitable non-magnetic housing 14, and may be driven by any suitable power means (not shown) connected to the input shaft 15 (Figs. 2 and 3). The driven gears 11, 12 may be connected to a common output shaft 16 (Fig. 1) for driving the latter in one direction or the other depending on which driven gear is magnetized. The gears 11, 12 are fast on to shafts 17, 18 journaled in antifriction bearings 19 in the end walls 20, 21 of the housing. The shaft 18 is directly connected to the driven shaft 16, while the shaft 17 has on its outer end a gear 22 meshing with an idler gear 23 which in turn meshes with a gear 24 on the outer end of the shaft 18. Thus, when the gear 12 is magnetically coupled to the drive worm 10, the connection to the shaft 16 is directly through the shaft 18, whereas when the other driven gear 11 is magnetically coupled with the drive worm 10 the drive connection to the shaft 16 is completed through the shaft 17 and gears 22, 23, 24.

Energizing windings 25, 26 are employed for linking the drive worm 10 magnetically with the respective gears 11, 12. Such windings embrace the respective shafts 17, 18 of the worm gears in closely spaced relation so that each winding acts when energized to induce a flow of flux generally axially through the corresponding shaft. These shafts, like the worm and worm gears, are made of magnetizable material.

Low reluctance paths for the fluxes induced by the windings 25, 26 are completed through a core structure comprising the casing end 21 and a projection 27 made of magnetizable material. The body or side wall portion 14 of the casing, as well as the casing end wall 20 and end cap 28, are all made of non-magnetic material so as to minimize leakage of flux through them. The ends of the shafts 17, 18 are extended well within the casing end member 21 (see Fig. 2) and the projection 27 is extended closely adjacent the periphery of the drive worm 10 at a point substantially midway between the active face areas of the worm gears 11, 12. The end face of the projection 27 is concaved in conformity with the contour of the worm so as to minimize the air gap therebetween.

The means paths traversed by the fluxes induced by the windings 25, 26 are indicated generally by the arrow lines A, B in Fig. 4. The direction of the flow of flux in either of the paths will, of course, depend upon the direction of flow of energizing current in the corresponding winding. Such windings may be energized either by direct or alternating current, although the former is preferred.

The invention contemplates the provision of means for counteracting any tendency of the flux created by the energization of one of the windings to be by-passed from its regular path through the inactive driven gear and produce a torque opposing the torque produced by the main flux flow through the intended path. To avoid such a reduction in the power transmitted, provision is made herein for partially energizing the winding corresponding to the inactive worm gear at a low potential as compared to that applied to the one of the active winding and with a polarity related to that of the latter winding in such a sense that the flux induced by the non-selected winding substantially neutralizes or balances out the leakage flux which would otherwise tend to flow from the worm 10 to the non-selected one of the driven gears. For this purpose, a rheostat 29 (see Fig. 4) is included in the circuit, being connected between conductors 30, 31 leading from respective end terminals of the windings to contacts 32, 33 of a selector switch 34. The movable contact 35 of this selector switch is connected to one supply line L1 while the other supply line L2 is connected through a conductor 36 to the interconnected remaining end terminals of the windings.

When the switch 34 is in its mid position shown, both windings 25, 26 are open-circuited. Upon closing the switch contact 33, the winding 25 is connected across the full line voltage, thus inducing a flow of flux along the arrow line A to link the drive worm 10 to the driven worm gear 11. At the same time the other winding 26 is connected across the line but in series with the rheostat 29 so that it is energized with reduced voltage and tends to induce a flow of flux along the path indicated by the arrow line B. The latter sets up a counter-magnetomotive force effectually balancing out any leakage flux which would otherwise tend to flow from the drive worm 10 to the driven worm gear 12. Similarly, closure of the switch blade 35 against the other stationary contact 32 connects the winding 26 directly across the line for full energization while the winding 25 is energized in series with the rheostat 29 to set up a low counter-magnetomotive force. Adjustment of the rheostat 29 serves to vary the amount of counter-magnetomotive force set up so that the latter can be accurately proportioned to balance out exactly the leakage flux.

The control switch 34 and rheostat 29 as well may be located at a remote point of control as desired.

By way of recapitulation of the operation, it may be assumed that the drive worm 10 is rotating continuously in a clockwise direction as viewed in Fig. 1. With the control switch 34 in its mid position, both of the windings 25, 26 are deenergized so that no flux flows and the worm gears 11, 12 and the output shaft 16 remains at rest. Closure of the switch contact 32 energizes the winding 26 at full voltage, thereby linking the worm gear 12 magnetically with the drive worm 10 so that the shaft 17 of this worm gear is rotated counterclockwise (as viewed from its upper end in Fig. 3), wherefore the shaft 17 is likewise revolved counterclockwise. During this time, the worm gear 11 rotates idly in the same direction as the selected worm gear 12, by reason of their interconnection through the gears 24, 23, 22, and such motion of the worm gear 11 is unopposed by any inadvertent flux leakage since the low voltage energization of its associated winding 25 neutralizes the flux which tends to leak between the drive worm 10 and the worm gear 11.

To cause the shaft 16 to be driven in the opposite direction, the control switch 34 is thrown to its opposite position closing the switch contact 33. Thereupon, the winding 25 is energized at full voltage, so that the worm gear 11 is linked by flux with the drive worm 10 and drives the shaft 16 through the gears 22, 23, 24 in a clockwise direction (as viewed from its upper end).

I claim as my invention:

1. An electrically controlled reversible gearing comprising in combination, a drive worm, a pair of driven gears having teeth disposed in closely adjacent non-contacting relation with the thread of the worm on substantially diametrically opposite sides of the latter, said gears being carried on generally parallel shafts lying in a plane substantially normal to the axis of the worm, said worm and said gears and said shafts all being of magnetizable material, a core structure forming low reluctance flux paths from said shafts to a point on the periphery of the worm substantially midway between said gears, and windings embracing the respective shafts and energizable selectively to induce the flow of flux through one or the other of said shafts and the gear thereon, each flow of flux linking the respective gear to the worm and passing between the worm and the respective shaft through said core structure.

2. An electrically controlled reversible gearing comprising in combination, a drive worm having a helical thread, a pair of driven gears each having spiral teeth of the same pitch as said thread and disposed in closely adjacent non-contacting relation with respect to the thread of the worm, a pair of generally parallel shafts carrying the respective gears, said worm and said gears and said shafts all being of magnetizable material, a core structure forming low reluctance flux paths from said shafts to an area on the periphery of the worm disposed intermediate the active areas of said gears, and means including alternatively available windings embracing the respective shafts for inducing flows of flux through the respective shafts and the gears thereon.

3. The combination of, a drive worm and a pair of driven worm gears having teeth disposed in closely adjacent non-contacting relation with respect to the thread of the worm, both said gears and worm being of magnetizable material, and windings energizable selectively to induce a flow of flux linking said worm with one or the other of said gears.

4. The combination of a rotatable gear element, a pair of coacting gear members having teeth disposed closely adjacent to but spaced from the teeth of said element in registering relation with respect to the latter, said element and members being composed of magnetizable material, means providing two separate flux paths through the opposed registering areas of said element and the respective members, and means selectively operable to produce a flow of flux through one or the other of said paths and cause the transmission of rotary power through said element and a corresponding one of said members.

5. The combination of a revoluble element, a pair of revoluble members, means including a pair of generally parallel shafts for revolubly supporting said members on substantially diametrically opposite sides of said element, said shafts, said element and said members being composed of magnetizable material, a generally T-shaped core structure of magnetizable material disposed with the arms of the T adjacent outer end portions of respective ones of said shafts and with the stem of the T projecting into close proximity with said element at a point on the latter substantially midway between the opposed areas of said element and members, a pair of energizing windings encircling the respective shafts for inducing a flow of flux in paths of low reluctance which link respective ones of said members to said element and both of which paths are completed through said core structure.

6. The combination of a rotatable gear element, a pair of coacting gear members disposed with their peripheries in registering relation but out of contact, shafts supporting the respective members, said shafts, said element and said members being composed of magnetic material, means providing separate low reluctance flux paths through said element and the respective members and along said shafts, and windings selectively energizable to create a flow of flux along one or the other of said paths and through the registering areas of said element and the corresponding one of said members.

7. The combination of a revoluble gear element, a pair of revoluble gear members disposed in closely adjacent non-contacting relation with respect to said element, said element and members being composed of magnetizable material, means defining two low reluctance flux paths linking said element with the respective members, means including a pair of windings for inducing a flow of flux through the respective paths, and means for fully energizing a selected one of said windings to produce a main flux flow through one of said paths while partially energizing the other winding with a polarity of a sense opposing the leakage of said main flux through the other of said paths.

8. The combination of a rotatable gear element, a pair of coacting gear members having teeth disposed closely adjacent to but spaced from the teeth of said element in registering relation with respect to the latter, said element and members being composed of magnetizable material, means providing two separate flux paths through the opposed registering areas of said element and the respective members, and means operable selectively to produce a main flux flow through one of said paths and a lesser secondary flux flow through the other path opposing the leakage of the main flux through the latter path.

9. The combination of a rotatable gear element, a pair of coacting gear members having teeth disposed closely adjacent to but spaced from the teeth of said element in registering relation with respect to the latter, said element and members being composed of magnetizable material, means providing two separate flux paths through the opposed registering areas of said element and the respective members, windings energizable selectively to produce a main flux flow through one of said paths, and means for producing a secondary flux flow in the other path opposing the by-passing of the main flux through the latter path.

GEORGE FORREST DRAKE.